United States Patent
Igarashi et al.

[11] Patent Number: 5,329,190
[45] Date of Patent: Jul. 12, 1994

[54] TERMINATION CIRCUIT

[75] Inventors: Ryo Igarashi, Moriyama; Tatsuo Morikawa, Shiga, both of Japan

[73] Assignee: International Business Machines Corp, Armonk, N.Y.

[21] Appl. No.: 916,920

[22] Filed: Jul. 20, 1992

[30] Foreign Application Priority Data

Jan. 31, 1992 [JP] Japan .................................. 016246

[51] Int. Cl.⁵ .......................... H01P 1/22; H03K 5/153
[52] U.S. Cl. .................................... 307/540; 307/350; 307/360; 307/363; 379/394; 379/398
[58] Field of Search ............... 307/540, 350, 363, 360; 379/394, 398

[56] References Cited

U.S. PATENT DOCUMENTS 4,112,262  9/1978  Stiefel ................................. 379/394

OTHER PUBLICATIONS

Vol. 32, No. 4A, Sep., 1989, IBM Technical Disclosure Bulletin, pp. 393-395.

Vol. 28, No. 10, Mar., 1986, IBM Technical Disclosure Bulletin pp. 4268-4269.

*Primary Examiner*—Margaret R. Wambach
*Attorney, Agent, or Firm*—Bruce D. Jobse; John C. Smith

[57] ABSTRACT

A termination circuit having a large margin which prevents the occurrence of a reflected wave due to a noise at the far end of a transmission line, thereby reducing the power consumption in the termination impedance. The termination circuit is constructed such that a first transistor is connected to a first potential and a second transistor is connected to a second potential which constitute the output stage of the termination circuit. The transistors are driven by first and second inverters having different input/output characteristics, respectively, thereby increasing the operation margin of the termination circuit. Particularly, if the second potential is assumed to be lower than the first potential, the second inverter driving the second transistor has such input/output characteristics that it outputs an output voltage which turns off the second transistor before the first inverter turns on the first transistor as the input voltage increases.

12 Claims, 6 Drawing Sheets

TERMINATION CIRCUIT

BACKGROUND OF THE INVENTION

1. Technical Field

This invention is related to a termination circuit of a transmission line, and particularly to a termination circuit which is provided at the far end opposite to the input end of a transmission line, and which allows transmission of a signal wave with less distortion, reduces the noise of the transmission line, reduces the power consumption of the termination impedance terminating at the far end, and has a large operational margin.

BACKGROUND ART

Various termination circuits terminating with an impedance equal to the characteristic impedance of the transmission line have been proposed so that distortion of the waveform of the signal by reflection in the transmission line will be suppressed in transmission of a signal through the transmission line. For instance, there is a termination circuit wherein a termination impedance equal to the characteristic impedance of the transmission line is provided at the far end of the transmission line. Such a termination circuit suppresses waveform distortion of the signal and provides excellent propagation characteristics, but has the disadvantage that power consumption at the termination impedance is large.

Accordingly, termination circuits have been proposed wherein no current flows through the termination impedance when the signal in the transmission line does not change. For instance, there are active termination circuits using active elements such as CMOSs which are shown in Published Unexamined Japanese Patent Application Nos. 196528/1990, and 25325/1986, IBM Technical Disclosure Bulletin, Vol. 32, No. 4A, September 1989, pp. 393-395, and IBM Technical Disclosure Bulletin, Vol. 28, NO. 10, March 1986, pp. 4268-4269.

An example of such active termination circuits is shown in FIG. 6. In this active termination circuit, latch circuit 60 consisting of two CMOS inverters 62 and 64 forms a termination circuit. A power supply voltage Vdd is applied to latch circuit 60. If the signal voltage given to latch circuit 60 from transmission line 68 through terminal 66 is from 0V to nearly Vdd or from nearly Vdd to 0V, the latch circuit operates stably. However, for a voltage change in the order of ½ of Vdd, the operation is unstable.

This will be clearer if the input/output characteristics of CMOS inverter 62 shown in FIG. 7 are referred to. That is, from the graph of the input/output characteristics in which Vdd is shown as 5V, when the signal voltage varies from 0V to 2.5V which is ½ of Vdd, the output voltage of CMOS inverter 62 only changes from 5V to around 4V, and the output voltage near to 4V cannot turn off the N-channel MOS transistor which is connected to the ground voltage of CMOS inverter 64, and accordingly the signal voltage of transmission line 68, having changed from 0V to 2.5V, causes a current to flow from feedback line 65 through the N-channel MOS transistor, which does not turn off. Thus the operation is not stable and is power consuming.

In addition, when the signal voltage changes from 5V to 2.5V, the output voltage of CMOS inverter 62 changes from 0V to nearly 4V, and the output voltage of nearly 4V can turn off the P-channel MOS transistor connected to the power supply voltage of CMOS inverter 64, but it would turn on the N-channel MOS transistor connected to the ground potential of CMOS inverter 64, and consequently the signal voltage on transmission line 68, having changed from 5V to 2.5V, causes a current to flow from feedback line 65 through the N-channel MOS transistor, which has turned on. Thus the operation is not stable and is power consuming.

Incidentally, the signal voltage of a transmission line will become about half the power supply voltage Vdd in the following case. For instance, there is the case whereby through terminating both the input and far ends of the transmission line with an impedance equal to the characteristic impedance of the transmission line, reflection of the signal wave at both ends is suppressed thereby attempting to achieve ideal signal transmission. In this case, a voltage change of about half the voltage change of the input signal occurs at the far end of the transmission line.

Accordingly, if an ideal signal transmission is performed by suppressing reflection of the signal wave at both the input and far ends of a transmission line, the termination circuit provided at the far end of the transmission line must ensure a large operational margin so that it can stably operate for signal waves with a voltage change of about half the voltage change of the input signal; however, such an assurance was not provided in the conventional termination circuit.

As described above, the conventional termination circuit causes a problem in that operation becomes unstable when ideal signal transmission is performed by suppressing the signal wave reflection at both the input and far ends of a transmission line.

SUMMARY OF THE INVENTION

Accordingly, it is the object of this invention to provide a termination circuit having a large margin which suppresses signal wave reflection in a transmission line and prevents the occurrence of a reflected wave due to noise.

The object of this invention also includes the provision of a termination circuit having a large margin which reduces the power consumption at the termination impedance.

Moreover, the object of this invention also includes the provision of a termination circuit which can stably operate for signal waves with a voltage change of about half the voltage change of the input signal.

And, the object of this invention also includes the provision of a termination circuit which can reduce the power consumption in the termination impedance to zero when the transmission signal is in a stable condition.

Furthermore, the object of this invention also includes the provision of a termination circuit in which the far end of a transmission line is terminated with the characteristic impedance of the transmission line thereby to prevent the occurrence of noise when there are changes in the signal voltage.

The termination circuit of this invention is newly constructed, for increasing the operational margin of the terminal circuit, so that a first transistor connected to a first potential and a second transistor connected to a second potential, which form the output stage of the terminal circuit, are driven by separate first and second inverters having different input/output characteristics, respectively.

Particularly if the second potential is lower than the first potential, the second inverter driving the second transistor has input/output characteristics such that it outputs an output voltage which turns off the second transistor before the first inverter turns on the first transistor, as the input voltage increases. For instance, for a signal wave of a small voltage which is about half the maximum voltage of the signal input to the transmission line, the first inverter has input/output characteristics such that it outputs an output voltage that does not turn on the first transistor, and the second inverter has input/output characteristics such that it outputs an output voltage that turns off the second transistor.

In consequence, the termination circuit of this invention can also respond to a signal wave with a voltage change which is smaller than that in the conventional termination circuit. For this, in response to a signal wave of such a small voltage change, only either the first or the second transistor, whichever is in the ON state, becomes OFF, and thereafter the other transistor in the OFF state changes to the ON state. Thus, since the termination circuit of this invention is constructed such that it can also respond to a signal wave with a small voltage change, it has a large operational margin.

In addition, the termination circuit of this invention is constructed so that no current will flow through the termination impedance when the transmission signal is in a steady state; thus power consumption can be substantially reduced.

Moreover, since the termination circuit of this invention is constructed so that the far end of the transmission line is terminated with the characteristic impedance of the transmission line, increase in noise due to reflection at the far end can be prohibited.

DESCRIPTION OF THE PREFERRED EMBODIMENT

Now, the embodiments of this invention are described with reference to the drawings.

Figure 1:
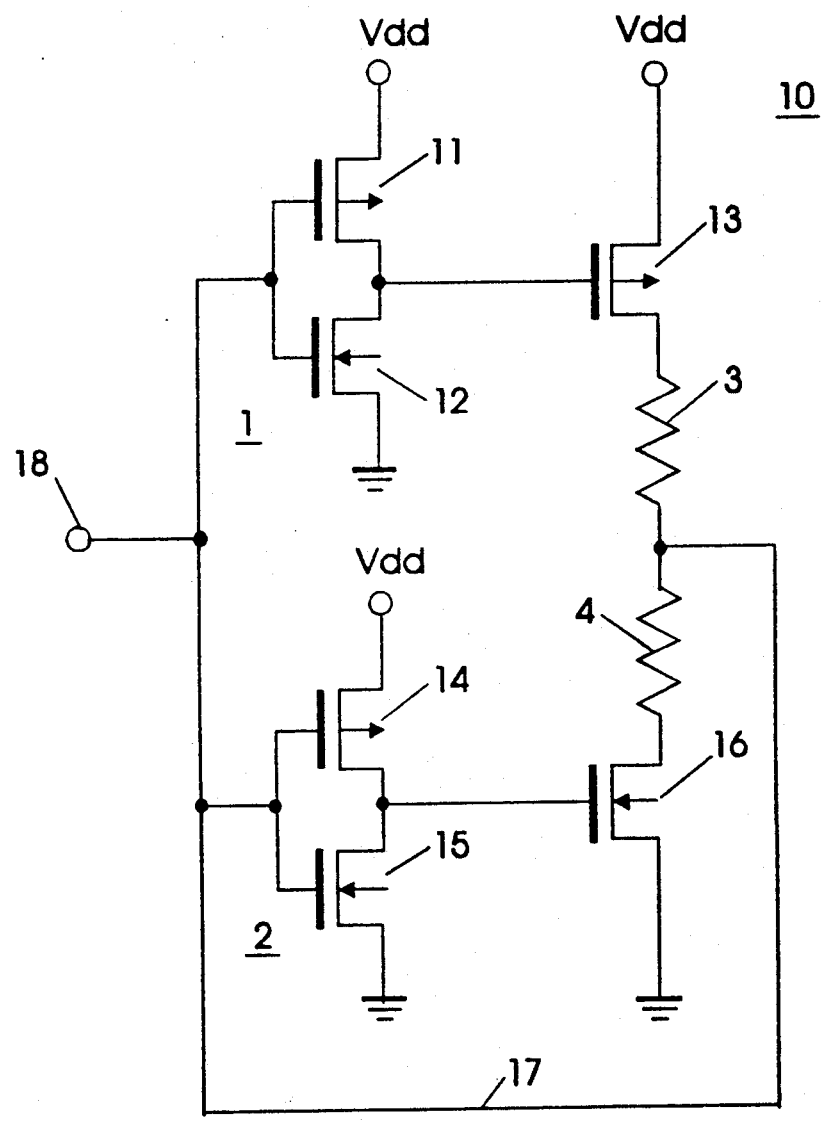
FIG. 1 is a diagram showing the termination circuit according to an embodiment of this invention.

The termination circuit according to an embodiment of this invention is shown in FIG. 1. In termination circuit 10 shown in FIG. 1, inverter 1 consists of P-channel MOS transistor 11 and N-channel MOS transistor 12 which are connected in series between a power supply voltage Vdd and the ground potential, and inverter 2 also consists of P-channel MOS transistor 14 and N-channel MOS transistor 15 which are connected in series between the power supply voltage Vdd and the ground potential. The output of inverter 1 drives P-channel MOS transistor 13, and the output of inverter 2 drives N-channel MOS transistor 16.

The output stage consists of P-channel MOS transistor 13 connected to the power supply voltage Vdd, forming a first transistor, N-channel MOS transistor 16 connected to the ground potential, forming a second transistor, and resistances 3 and 4 connected in series between P-channel MOS transistor 13 and N-channel MOS transistor 16. The output of the output stage is fed back via feedback line 17 from the junction of resistances 3 and 4, constituting an output node to the inputs of inverters 1 and 2. Input terminal 18 is connected to the far end of a transmission line.

For termination with the characteristic impedance of the transmission line in termination circuit 10, the sum of the impedance in the ON state of P-channel MOS transistor 13 and resistance 3 is selected so as to be substantially equal to the characteristic impedance thereof. Similarly, the sum of the impedance in the ON state of N-channel MOS transistor 16 and resistance 4 is selected so as to be substantially equal to the characteristic impedance.

In termination circuit 10 shown in FIG. 1, in order to terminate the far end of the transmission line with the characteristic impedance of the transmission line, the output stage has resistances 3 and 4 in addition to the first and second transistors, and these resistances are used to make the termination impedance substantially equal to the characteristic impedance of the transmission line. Since such an output stage construction allows the impedances of P-channel MOS transistor 13 and N-channel MOS transistor 16 in the ON state to be selected to be small and since the termination impedance can be set mainly by resistances 3 and 4, high-performance termination that has excellent linearity for current and voltage is enabled. Furthermore, since the setting of the characteristic parameter of P-channel MOS transistor 13 and the value of resistance 3 and the setting of the characteristic parameter of N-channel MOS transistor 16 and the value of resistance 4 can be performed separately, the degree of freedom for circuit design becomes large.

The output stage may also be formed by providing resistance between the junction of the first and second transistor and the output node instead of providing such a pair of resistances between the first and second transistors. Also in this case, the sum of the impedance of the first transistor in the ON state and the resistance is selected so as to be substantially equal to the characteristic impedance of the transmission line, and the sum of the impedance of the second transistor in the ON state and the resistance is selected so as to be substantially equal to the characteristic impedance of the transmission line. Thus, since the value of the resistance is set in consideration of the impedances of both the first and second transistors in the ON state, the circuit construction becomes simpler than in the previous case because only one resistance is needed, although the degree of freedom of circuit design becomes smaller. In addition, also in the output stage of such a circuit construction, the termination impedance can be set mainly with resistance, so that high-performance termination with excellent linearity for current and voltage is possible.

Now, the operation of the termination circuit shown in FIG. 1 is described with reference to FIGS. 2 and 3.

Figure 2:
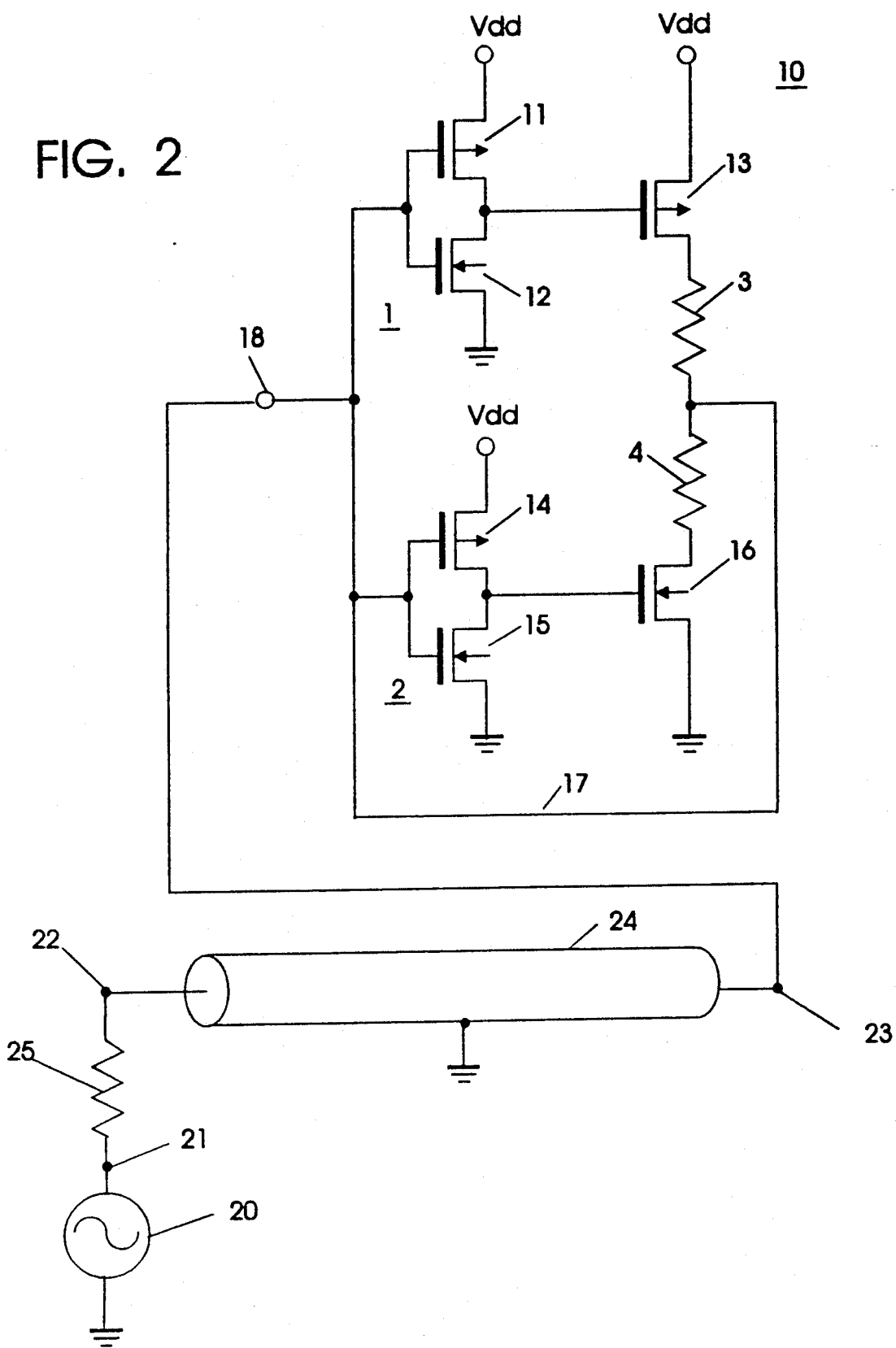
FIG. 2 is a diagram showing termination of a transmission line with the termination circuit shown in FIG. 1.

FIG. 2 shows termination of a transmission line with the termination circuit shown in FIG. 1. With respect to the termination circuit and the structural elements thereof, the same reference numerals are used as in FIG. 1. Transmission line 24 has its input terminal 22 connected via resistance 25 to signal source 20, and its far-end terminal 23 connected to input terminal 18 of termination circuit 10. Resistance 25 is selected so as to be substantially equal the characteristic impedance of transmission line 24.

Figure 3:
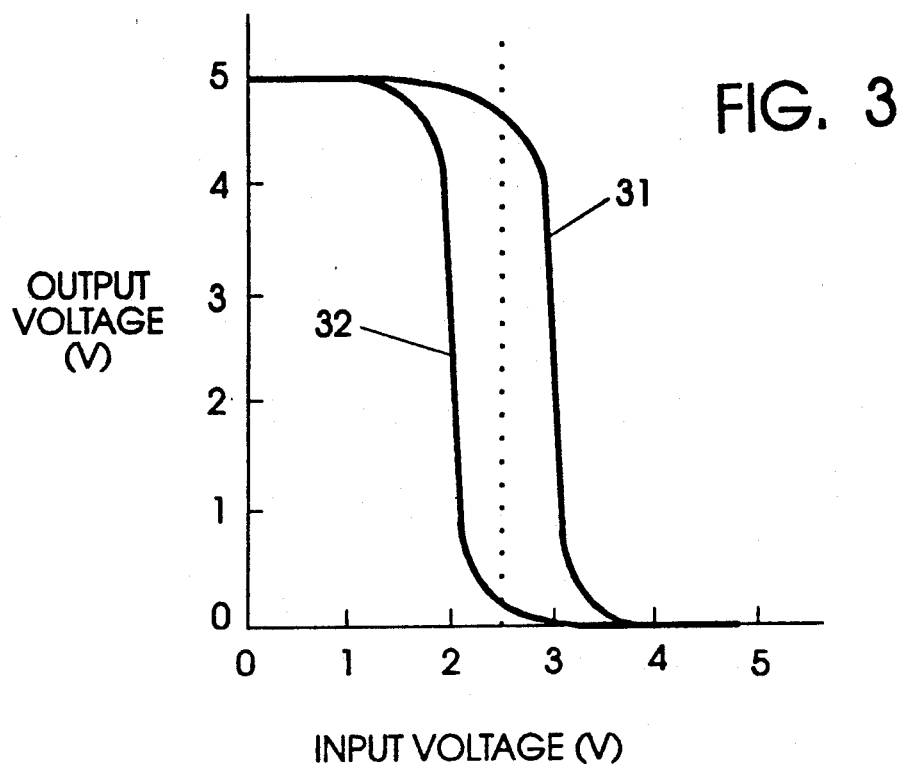
FIG. 3 is a graph showing the input/output characteristics of the two inverters constituting the termination circuit shown in FIG. 1.
Figure 7:
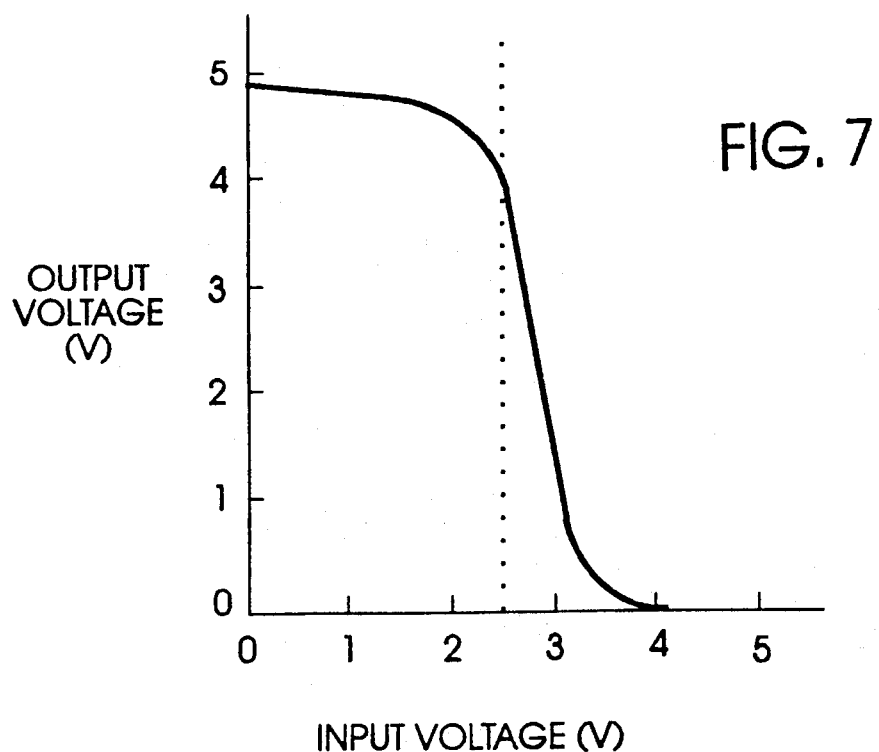
FIG. 7 is a graph showing the input/output characteristics of the input stage inverters constituting the conventional termination circuit shown in FIG. 6.

FIG. 3 shows the input/output characteristics of the two inverters 1 and 2 constituting termination circuit 10, assuming that the maximum input voltage and power supply voltage Vdd are 5V. Characteristic curve 31 represents the input/output characteristics of inverter 1 and characteristic curve 32 represents the input/output characteristics of inverter 2. Characteristic curve 32 shows that inverter 2 can positively turn off N-channel MOS transistor 16 when the input voltage changes from 0V to 2.5V, because the output voltage changes from 5V to 0.3V. Also, inverter 2 never turns on N-channel MOS transistor 16 when the input voltage changes from 5V to 2.5V, because the output voltage increases from 0V to only about 0.3V.

Referring to FIG. 2, if the potentials of terminals 21, 22 and 23 are assumed to be 0V as an initial condition, P-channel MOS transistors 11 and 14 are ON and N-channel MOS transistors 12 and 15 are OFF.

Accordingly, the gate potentials of P-channel MOS transistor 13 and N-channel MOS transistor 16 are the 5V of the power supply voltage Vdd, because the description is made on the assumption that the power supply voltage Vdd is 5V, and P-channel MOS transistor 13 is OFF and N-channel MOS transistor 16 is ON.

Since, in this case, the sum of resistance 4 and the ON-resistance of N-channel MOS transistor 16 is selected so as to be substantially equal to the characteristic impedance of transmission line 24, transmission line 24 is terminated with the characteristic impedance thereof. Because of this, the occurrence of a reflected wave due to noise at the far end of transmission line 24 is prevented. And, N-channel MOS transistor 16 connected to the ground potential is ON, one end of resistance 4 is equal to the ground potential, and the potential of terminal 23 of transmission line 24 is 0V and the other end of resistance 4 is also 0V, equal to the ground potential via feedback line 17, and thus no current flows through resistance 4, which results in zero power consumption in a steady state in which the signal voltage of transmission line 24 is 0V.

Then, when the potential of terminal 21 is changed from 0V to 5V by signal source 20, the potential of terminal 22 changes from 0V to 2.5V since resistance 25 has been selected to be a value equal to the characteristic impedance of transmission line 24. This potential change propagates through transmission line 24 and appears on terminal 23. And, since terminal 23 is terminated with the characteristic impedance of transmission line 24 by resistance 4 and the ON-resistance of N-channel MOS transistor 16 and since the occurrence of a reflected wave at the far end of transmission line 24 is prevented, the potential of terminal 23 is maintained at 2.5V.

Inverter 2 responds to potential change at terminal 23. That is, as is obvious from characteristic curve 32 of the input/output characteristics of inverter 2 shown in FIG. 3, the output voltage changes from 5V to substantially 0V as the input voltage changes from 0V to 2.5V. Since the output voltage of inverter 2 becomes substantially 0V, N-channel MOS transistor 16 is turned off. Since the current flowing through N-channel MOS transistor 16 to the ground potential is shut off when N-channel MOS transistor 16 is turned off, the current flowing in resistance 4 changes its direction and begins to propagate in the direction of terminal 22 of transmission line 24. This means that a reflected wave having a potential change from 0V to 2.5V occurs in terminal 23 of transmission line 24 as the current flowing in N-channel MOS transistor 16 is shut off. The potential of terminal 23 becomes 5V as a result of superposition of the reflected wave. In addition, the reflected wave is terminated by resistance 25, which is provided at the input of transmission line 24 and is equal to the characteristic impedance of transmission line 24, and is not reflected again at terminal 22 of transmission line 24.

Further, when the potential of terminal 23 of transmission line 24 becomes 5V, the output voltage of inverter i changes from about 5V to 0V, as apparent from FIG. 3, and P-channel MOS transistor 13 changes from OFF to ON. When P-channel MOS transistor 13 changes to ON, transmission line 24 is terminated with the characteristic impedance thereof because the sum of resistance 3 and the ON-resistance of P-channel MOS transistor 13 is selected to be a value substantially equal to the characteristic impedance of transmission line 24. Accordingly, as detailed later, if noise (usually not greater than +1.5V) is induced in transmission line 24, the occurrence of a reflected wave due to the noise can be prevented because of termination with the characteristic impedance thereof. And, P-channel MOS transistor 13, connected to the 5V of the power supply voltage Vdd, is ON and one end of resistance 3 is 5V, and in addition, the potential of terminal 23 of transmission line 24 is 5V and the other end of resistance 3 is also 5V via feedback line 17, and thus no current flows in resistance 3, which therefore results in zero power consumption at a steady state in which the signal voltage of transmission line 24 is 5V.

As described above, if a signal changing from 0V to 5V is input to transmission line 24, due to N-channel MOS transistor 16 being ON, in spite of the potential of terminal 23 of transmission line 24 changing from 0V to 2.5V, which is half of 5V, with the terminal 23 of transmission line 24 being terminated with the characteristic impedance thereof, N-channel MOS transistor 16 is turned off by the input/output characteristics of inverter 2 and the current flowing through N-channel MOS transistor 16 is shut off, so that a reflected wave causing a voltage increase of 2.5V occurs in terminal 23 of transmission line 24. The potential of terminal 23 of transmission line 24 is changed to 5V by the reflected wave to turn on P-channel MOS transistor 13, whereby terminal 23 of transmission line 24 is again terminated with the characteristic impedance thereof.

Thus, the termination circuit 10 according to this invention is constructed so that it allows the occurrence of a reflected wave only when a signal wave has reached the far end, thereby to double the voltage level of terminal 23 which is the far end of transmission line 24. That is, termination circuit 10 responds to a potential change in the signal wave on the order of +2.5V for allowing the occurrence of a reflected wave of about +2.5V. However, for noise, which is a potential change smaller than 2.5V, and is usually not greater than +1.5V, as is obvious from characteristic curves 31 and 32 of the input/output characteristics of inverters 1 and 2 shown in FIG. 3, their output voltages remain nearly 5V and substantially unchanged even if the input voltage changes from 0V to 1.5V, P-channel MOS transistor 13 is kept OFF by inverter 1, and N-channel MOS transistor 16 is kept ON by inverter 2 and is not turned off, which therefore causes termination circuit 10 to be inoperative. Such noise is terminated with impedance substantially equal to the characteristic impedance of transmission line 24 by termination circuit 10 and is suppressed.

Ultimately, since P-channel MOS transistor 13 and N-channel MOS transistor 16 in the output stage never become ON at the same time either for a signal or for noise, not only reduction of noise but also substantial reduction of power consumption can be achieved.

Next, if the potential of terminal 21 is changed by signal source 20 from 5V to 0V, the potential of terminal 22 of transmission line 24 changes from 5V to 2.5V. That is, a negative potential change having an amplitude of 2.5V occurs at terminal 22. When this potential change propagates through transmission line 24 and appears on terminal 23 of transmission line 24, the output voltage of inverter 1 varies from 0V to nearly 5V, as apparent from characteristic curve 31 of the input/output characteristics of inverter 1 shown in FIG. 3, and P-channel MOS transistor 13 is turned from ON to OFF, whereby the current flowing through P-channel MOS transistor 13 is shut off.

As a result of the shutting off of the current flowing through P-channel MOS transistor 13, a reflected wave equal to a negative potential change having an amplitude of 2.5V occurs in terminal 23 of transmission line 24. The reflected wave propagates through transmission line 24 and is superposed on the potential change appearing at terminal 23, whereby the potential of terminal 23 of transmission line 24 is changed to zero. In addition, as described above, since the reflected wave propagates to terminal 22 of transmission line 24 and is terminated by resistance 25, which is equal to the characteristic impedance of transmission line 24, the reflected wave is not reflected again at terminal 22.

Moreover, when the potential of terminal 23 of transmission line 24 becomes 0V, the output voltage of inverter 2 changes from nearly 0V to 5V as seen from FIG. 3 and N-channel MOS transistor 16 in turn changes from OFF to ON. When N-channel MOS transistor 16 becomes ON, since the sum of resistance 4 and the ON-resistance of N-channel MOS transistor 16 is preselected to be a value substantially equal to the characteristic impedance of transmission line 24, the far end of transmission line 24 is terminated with the characteristic impedance thereof. Accordingly, as detailed later, if noise (usually not greater than −1.5V) is induced in transmission line 24, the occurrence of a reflected wave due to the noise is prevented because of termination with the characteristic impedance thereof. In addition, since N-channel MOS transistor 16, connected to the 0V of the ground potential, is ON and one end of resistance 4 is 0V, and the potential of terminal 23 of transmission line 24 is 0V and the other end of transmission 4 is also 0V via feedback line 17, no current flows in resistance 4, which therefore results in zero power consumption at a steady state in which the signal voltage on transmission line 24 is 0V.

As seen from the foregoing, for the inputting of a signal changing from 5V to 0V to transmission line 24, even if the potential of terminal 23 of transmission line 24 changes from 5V to 2.5V, which is half of 5V, by terminal 23 of transmission line 24 being terminated with the characteristic impedance thereof by the ON state of P-channel MOS transistor 13, P-channel MOS transistor 13 is turned off by the input/output characteristics of inverter 1 and the current flowing through P-channel MOS transistor 13 is shut off, and thus a reflected wave causing a voltage reduction of 2.5V occurs in terminal 23 of transmission line 24. The potential at terminal 23 of transmission line 24 is changed to 0V by the reflected wave to turn on N-channel MOS transistor 16, whereby terminal 23 of transmission line 24 is again terminated with the characteristic impedance thereof.

Thus, also for the falling of the potential of a signal wave, the termination circuit 10 according to this invention is constructed so that it permits the occurrence of a reflected wave only when the signal wave has reached the far end to double the voltage level of terminal 23, which is the far end of transmission line 24. That is, termination circuit 10 responds to a potential change of about −2.5V in the signal wave to allow the occurrence of a reflected wave of the order of −2.5V. However, for a noise, a potential change smaller than −2.5V (usually not greater than −1.5V), the output voltages of inverters 1 and 2 remain nearly 0V and substantially unchanged for the input voltage varying from 5V to 3.5V, as obvious from characteristic curves 31 and 32 of the input/output characteristics of inverters 1 and 2 shown in FIG. 3, and P-channel MOS transistor 13 is therefore kept to be ON by inverter 1 without being turned off. And N-channel MOS transistor 16 is kept to be OFF by inverter 2, and thus termination circuit 10 does not operate. Such noise is terminated and suppressed with impedance substantially equal to the characteristic impedance of transmission line 24 by termination circuit 10.

Since, also in this case, P-channel MOS transistor 13 and N-channel MOS transistor 16 in the output stage never be simultaneously ON for either a signal wave or noise, not only reduction of the noise but also substantial reduction of the power consumption can be accomplished.

As recognized, the termination circuit according to this invention has thoroughly solved the problem that the operation becomes unstable if reflection of a signal wave is suppressed at both input and far ends of a transmission line to perform an ideal signal transmission, as seen in the conventional termination circuit. If the termination circuit according to this invention is applied to a transmission line, the potential change at the input end of the transmission line propagates through the transmission line and appears at the far end, and a reflected wave substantially equal in phase therewith occurs in the far end and they are superposed on each other, so that it is accompanied with no waveform distortion.

Although, in the above description, a circuit using CMOS transistors has been described as the termination circuit according to this invention, this invention is not limited to a circuit using CMOS transistors, but the termination circuit according to this invention may be constructed using bipolar transistors.

Figure 4:
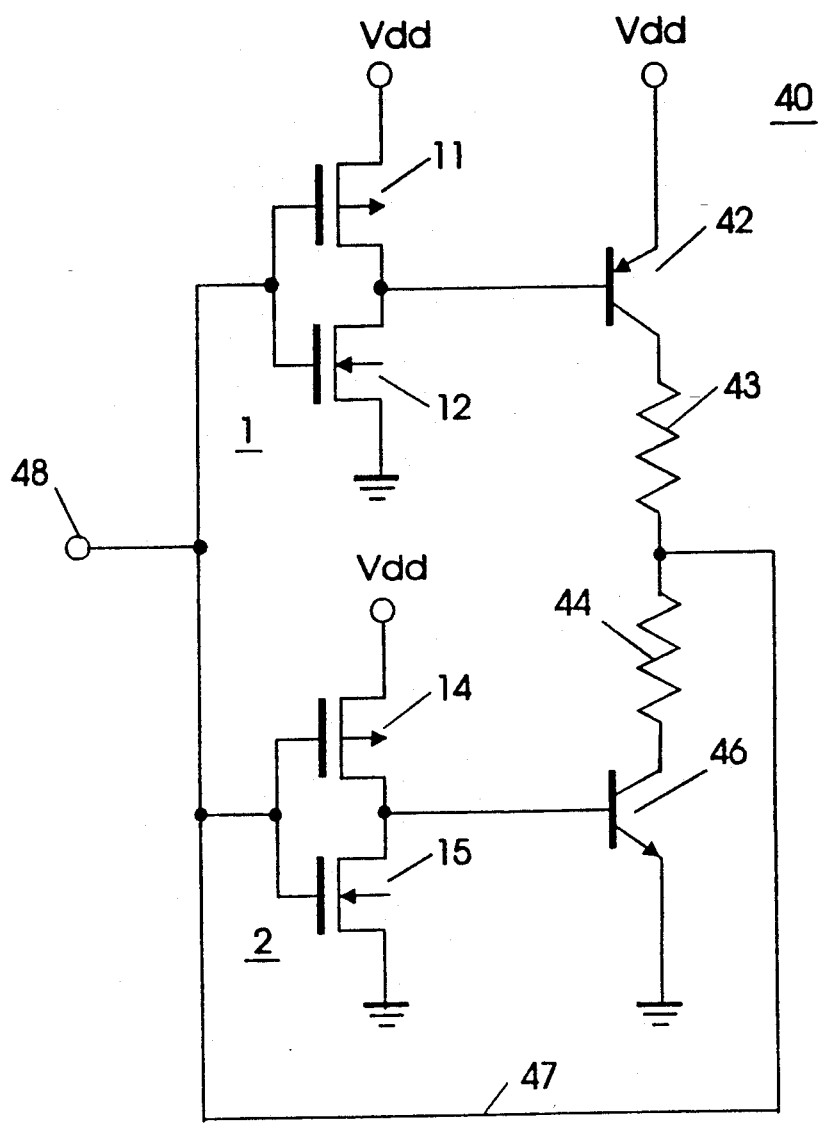
FIG. 4 is a diagram showing a termination circuit using bipolar transistors according to an embodiment of this invention.

For instance, one example of the termination circuit using bipolar transistors is shown in FIG. 4. In the termination circuit shown in FIG. 4, the two CMOS inverters 1 and 2 are still used, but PNP bipolar transistor 42 and NPN bipolar transistors 46 are used in the output stage as alternates to P-channel MOS transistor 13 and N-channel MOS transistor 16, respectively. Resistances 43 and 44 are preselected so that the transmission line connected to input terminal 48 is terminated with the characteristic impedance thereof via feedback line 47.

Figure 5:
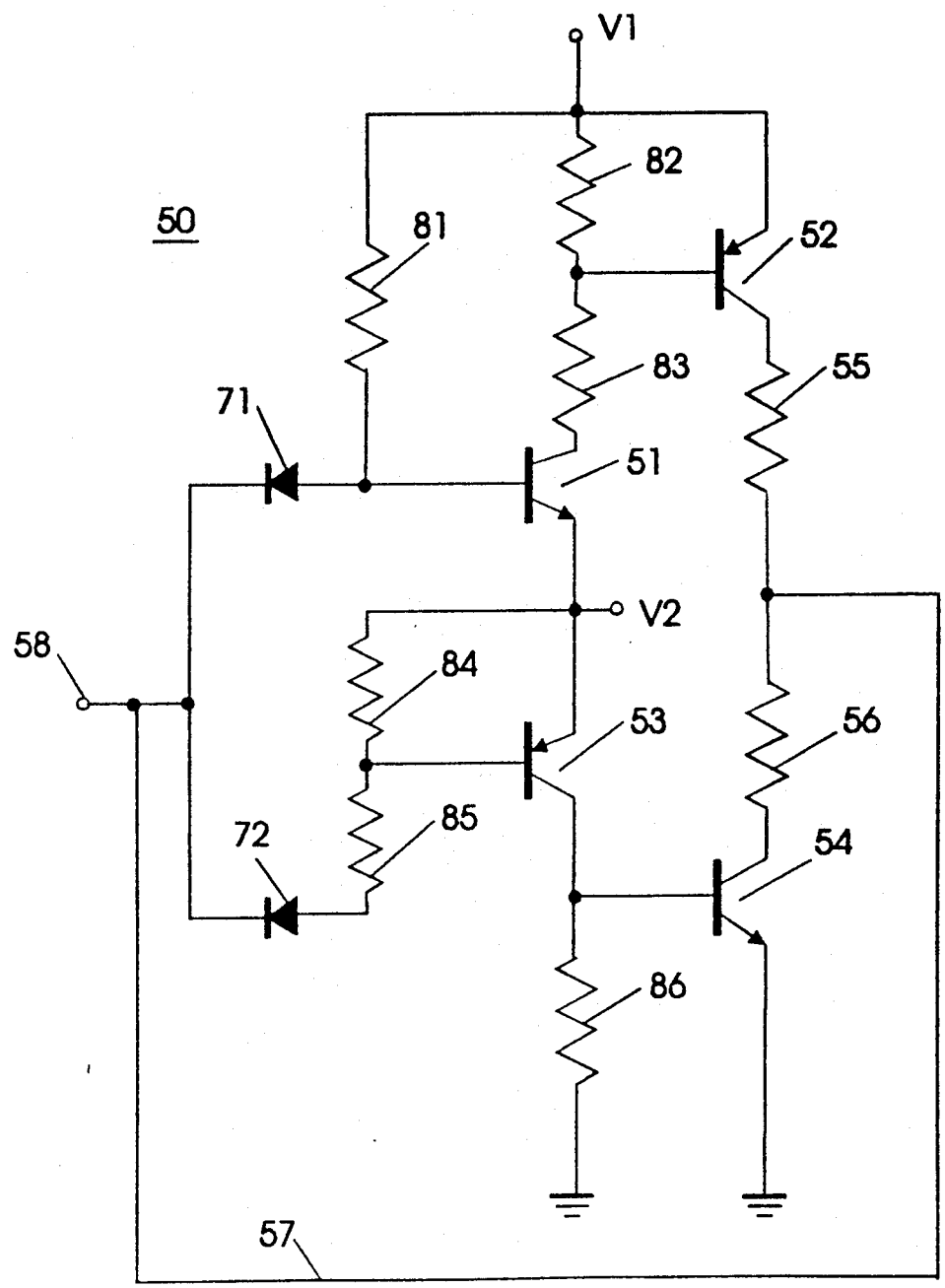
FIG. 5 is a diagram showing a further termination circuit using bipolar transistors according to an embodiment of this invention.
Figure 6:
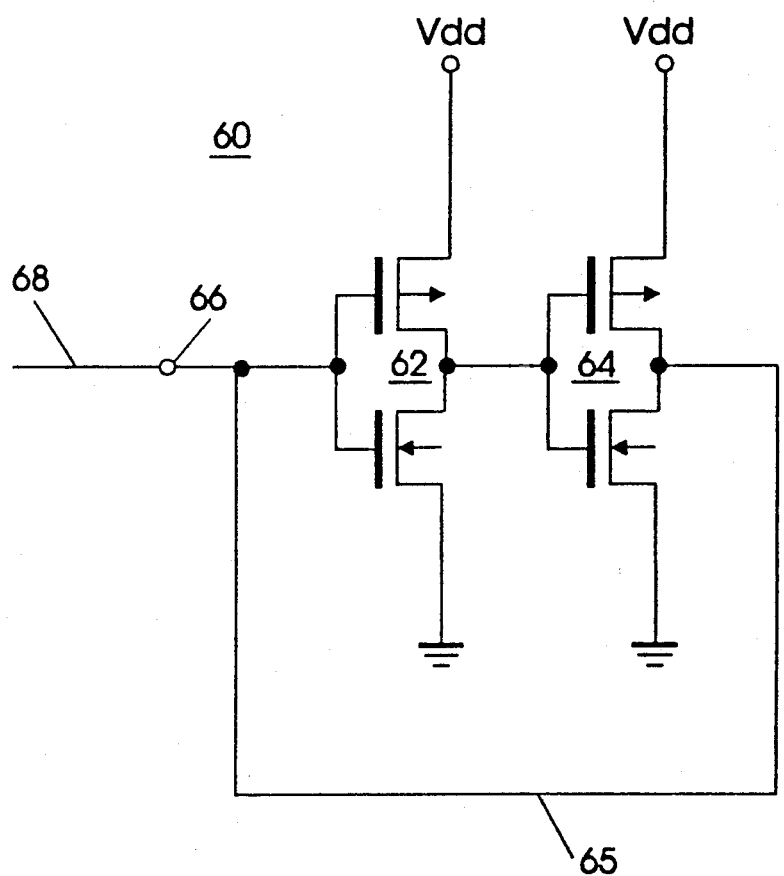
FIG. 6 is a diagram showing the conventional termination circuit.

A further example of the termination circuit using bipolar transistors is shown in FIG. 5. In the termination circuit shown in FIG. 5, the transistors used are all bipolar transistors. The operation of this termination circuit is now described. If the potential of input terminal 58 connected to the far end of a transmission line is assumed to be 0V as the initial condition, PNP bipolar transistor 52 and NPN bipolar transistor 54 are OFF and ON, respectively.

In this case, since the sum of resistance 56 and the ON-resistance of NPN bipolar transistor 54 is selected to a value substantially equal to the characteristic impedance of the transmission line, the transmission line is terminated with the characteristic impedance thereof. For this, the occurrence of a reflected wave due to a noise at the far end of the transmission line is prevented. And, since NPN bipolar transistor 54 is ON and one end of resistance 56 is at the ground potential, and the potential of input terminal 58 connected to the far end of the transmission line is 0V and by feedback line 57 the other end of resistance 56 is also 0V which is equal to the ground potential, no current flows in resistance 54, which therefore results in zero power consumption in a steady state in which the signal voltage of the transmission line is 0V.

Then, when the potential of input terminal 58 connected to the far end of the transmission line changes from 0V to 2.5V, then diode 72 changes from ON to OFF and PNP bipolar transistor 53 and NPN bipolar transistor 54 change from ON to OFF. When NPN bipolar transistor 54 becomes OFF, the potential of input terminal 58, in turn, changes from 2.5V to 5V by a reflected wave via feedback line 57. This change causes NPN bipolar transistor 51 to change from OFF to ON. As a result, PNP bipolar transistor 52 changes from OFF to ON.

In this case, the sum of resistance 55 and the ON-resistance of PNP bipolar transistor 52 is preselected to a value substantially equal to the characteristic impedance of the transmission line, and accordingly the transmission line is terminated with the characteristic impedance thereof. This also prevents the occurrence of a reflected wave due to a noise at the far end of the transmission line. And, since PNP bipolar transistor 52 connected to first potential V1 is ON and one end of resistance 55 is 5V, and the potential of input terminal 58 connected to the far end of the transmission line is 5V and the other end of resistance 55 is also 5V via feedback line 57, no current flows in resistance 55, which therefore results in zero power consumption at a steady state in which the signal voltage of the transmission line is 5V.

Now, the respective functions of the elements used in the terminal circuit shown in FIG. 5 are described. If it is assumed that first potential V1 is 5V and second potential V2 is 3V, diode 71 is inserted so that no excessive current flows in the base of NPN bipolar transistor 51 when the potential of input terminal 58 is about 3V or higher, while resistance 81 is provided to supply a base current for turning on NPN bipolar transistor 51. Resistance 83 is inserted so that no excessive current flows in the base of PNP bipolar transistor 52, and resistance 82 is provided to help PNP bipolar transistor 52 switch from ON to OFF.

Further, diode 72 is inserted to prevent a current flowing into second potential V2 at 3V via resistance 85 when the potential of input terminal 58 is about 2.5V or higher. Resistance 85 is inserted so that no excessive current flows in the base of PNP bipolar transistor 53, and resistance 84 is provided to help PNP bipolar transistor 53 switch from ON to OFF. Similarly, resistance 86 is provided to help NPN bipolar transistor 54 switch from ON to OFF.

Incidentally, also in the termination circuit shown in FIG. 5, the current when NPN bipolar transistor 51 and PNP bipolar transistor 53 are in an ON state may be selected to a small value, which therefore makes it possible to reduce the power required in the terminal circuit.

With this invention, a termination circuit having a large margin is obtained which can not only prevent the occurrence of a reflected wave due to a noise at the far end of a transmission line thereby to reduce the power consumption in the terminal impedance, but also can stably operate for a voltage change about half the voltage change of the input signal.

While the invention has been described with respect to a preferred embodiment thereof, it will be understood by those skilled in the art that various changes in detail my be made therein without departing from the spirit, scope, and teaching of the invention. Accordingly, the invention herein disclosed is to be limited only as specified in the following claims.

We claim:

1. A termination circuit comprising:
an output stage having an output node connected to a far end of a transmission line for terminating the far end of said transmission line with an impedance substantially equal to the characteristic impedance of said transmission line, said output stage having a first transistor connected to a first potential and a second transistor connected to a second potential, each of said first and second transistors having a control electrode,
a first inverter connected between the far end of said transmission line and the control electrode of said first transistor for driving said first transistor in response to a signal at the far end of said transmission line, and
a second inverter connected between the far end of said transmission line and the control electrode of said second transistor for driving said second transistor in response to the signal at the far end of said transmission line, said second inverter having input/output characteristics different from the input/output characteristics of said first inverter.

2. The termination circuit of claim 1 wherein said second potential is lower than said first potential, and said second inverter has input/output characteristics such that, in response to an increasing input voltage, said second inverter generates an output voltage which turns off said second transistor before said first inverter turns on said first transistor.

3. The termination circuit of claim 1 wherein the output node of said output stage is coupled to said first and second transistors through a common resistance, and wherein the total impedance of one of said first and second transistors during conduction, and said common resistance is substantially equal to the characteristic impedance of said transmission line.

4. The termination circuit of claim 1 wherein said output stage has a first resistance connected between said first transistor and said output node and a second resistance connected between said second transistor and said output node, and wherein one of the combined impedance of said first transistor during conduction with said first resistance, and the combined impedance of said second transistor during conduction with said second resistance is substantially equal to the characteristic impedance of said transmission line.

5. The termination circuit of claim 1 wherein said first and second inverters further comprise a P-channel MOS transistor and an N-channel MOS transistor serially connected between said first and second potentials, respectively.

6. The termination circuit of claim 1 wherein said first inverter further comprises a first resistance connected to said first potential, a second resistance connected to said first resistance, an NPN bipolar transistor having the collector connected to said second resistance and the emitter connected to a third potential, a third resistance connected between the base of said NPN bipolar transistor and said first potential, and a first diode connected between the base of said NPN bipolar transistor and the far end of said transmission line, and said second inverter further comprises a fourth resistance connected to said second potential, a PNP bipolar transistor having the emitter connected to said third potential and the collector connected to said fourth resistance, a fifth resistance connected between the base of said PNP bipolar transistor and said third potential, a sixth resistance connected to the base of said PNP bipolar transistor, and a second diode connected between said sixth resistance and the far end of said transmission line.

7. The termination circuit of claim 3 wherein said first potential is a power supply voltage, said first transistor is a P-channel MOS transistor, said second potential is a ground potential, and said second transistor is an N-channel MOS transistor.

8. The termination circuit of claim 3 wherein said first potential is a power supply voltage, said first transistor is a PNP bipolar transistor, said second potential is a ground potential, and said second transistor is an NPN bipolar transistor.

9. The termination circuit of claim 2 wherein said first and second inverters further comprise a P-channel MOS transistor and an N-channel MOS transistor serially connected between said first and second potentials, respectively.

10. The termination circuit of claim 2 wherein said first inverter further comprises a first resistance connected to said first potential, a second resistance connected to said first resistance, an NPN bipolar transistor having the collector connected to said second resistance and the emitter connected to a third potential, a third resistance connected between the base of said NPN bipolar transistor and said first potential, and a first diode connected between the base of said NPN bipolar transistor and the far end of said transmission line, and said second inverter further comprises a fourth resistance connected to said second potential, a PNP bipolar transistor having the emitter connected to said third potential and the collector connected to said fourth resistance, a fifth resistance connected between the base of said PNP bipolar transistor and said third potential, a sixth resistance connected to the base of said PNP bipolar transistor, and a second diode connected between said sixth resistance and the far end of said transmission line.

11. The termination circuit of claim 4 wherein said first potential is a power supply voltage, said first transistor is a P-channel MOS transistor, said second potential is a ground potential, and said second transistor is an N-channel MOS transistor.

12. The termination circuit of claim 4 wherein said first potential is a power supply voltage, said first transistor is a PNP bipolar transistor, said second potential is a ground potential, and said second transistor is an NPN bipolar transistor.

* * * * *